United States Patent [19]

Baker

[11] Patent Number: 5,037,480

[45] Date of Patent: Aug. 6, 1991

[54] BASE AND SUBBASE COMPOSITION

[75] Inventor: Gerald A. Baker, Hillsboro, Oreg.

[73] Assignee: Baker Rock Crushing Company, Beaverton, Oreg.

[21] Appl. No.: 533,598

[22] Filed: Jun. 5, 1990

[51] Int. Cl.$^5$ .............................................. C04B 7/34
[52] U.S. Cl. .................................. 106/816; 106/817; 106/800; 106/793; 106/900
[58] Field of Search ..................... 106/281.1, 464, 710, 106/900, 793, 800, 816, 817

[56] References Cited

U.S. PATENT DOCUMENTS

| | | | |
|---|---|---|---|
| 3,076,717 | 7/1959 | Minnick | 106/710 |
| 3,852,084 | 12/1974 | Webster | 106/710 |
| 4,018,619 | 4/1977 | Webster et al. | 106/710 |
| 4,105,463 | 8/1978 | Angelbeck | 106/710 |
| 4,496,267 | 1/1985 | Gnaedinger | 106/710 |

Primary Examiner—William R. Dixon, Jr.
Assistant Examiner—Paul Marcantoni
Attorney, Agent, or Firm—Chernoff, Vilhauer, McClung & Stenzel

[57] ABSTRACT

A base and subbase composition of quicklime and waste aggregate is disclosed, the composition having high strength and a high resilient modulus.

4 Claims, No Drawings

BASE AND SUBBASE COMPOSITION

BACKGROUND OF THE INVENTION

The use of lime to stabilize clay-bearing soils and aggregates for highway construction is well known. See, for example, "Lime Stabilization Construction Manual," Bulletin 326 (1987).

SUMMARY OF THE INVENTION

It has now been found that a surprisingly effective composition for base and subbase in highway and fill construction, having far superior unconfined compressive strength and in situ resilient modulus comprises, on a dry weight basis, 1.5 to 2 wt % quicklime mixed with a particular high clay content fill aggregate.

DETAILED DESCRIPTION OF THE INVENTION

According to the present invention there is provided a base and subbase composition of exceptionally high strength and in situ resilient modulus consisting essentially of 1.5 to 2.0 wt % quicklime mixed with an aggregate comprising the approximate weight percentages of the following components:

| Component | Wt % |
| --- | --- |
| $SiO_2$ | 60-65 |
| $Al_2O_3$ | 10-20 |
| FeO | 5-15 |
| CaO | 3-7 |
| $Na_2O$ | 1-5 |

Mixing may be by conventional methods, preferably by a pug mill.

The aggregate must be of the following gradation, substantially uniformly graded from coarse to fine, as determined by testing procedures C117 and C136 of the American Society for Testing and Materials (ASTM):

| Sieve Size | % Passing |
| --- | --- |
| 2" | 100 |
| 1½" | 95-100 |
| 1" | 60-98 |
| ¾" | 52-92 |
| ½" | 40-80 |
| #4 | 12-52 |
| #40 | 8-30 |
| #200 | 5-20 |

The quicklime, which is anhydrous CaO, is in granular form and must have a potency rating of at least 113% calcium hydroxide content as determined by testing procedure T219 of the American Association of State Highway and Transportation Officials (AASHTO). The gradation of the quicklime, as determined by AASHTO testing procedure T27, is:

| Sieve Size | % Passing |
| --- | --- |
| #4 | 100 |
| #100 | 40-80 |

EXAMPLES 1-4

High clay content aggregate having the composition and gradation noted below was mixed in the laboratory with simulated pug mill action with 2 wt % (by dry weight of aggregate) granular quicklime with a potency rating of 113% and having the gradation noted below. Cylindrical specimens 4 inches in diameter and 8 inches high were compacted to the optimum water content noted below to maximum dry density, both as determined by AASHTO test procedure T99. Because of the small scale involved, and in order to comply with standard testing procedures, prior to the mixing with lime, the +¾" fraction was scalped off and replaced with an equivalent amount of #4 to ¾" aggregate. The samples were compacted to the densities of 110-118 lb/ft³ noted below. Unconfined compression tests were performed in accordance with the procedures of ASTM D2166, after compaction and curing for 48 hours in a moist environment at 125° F., in accordance with ASTM STP 479(1). Results are shown in Table 1 below. The average unconfined compressive strength was 275 psi, substantially exceeding the AASHTO minimum recommended strengths of 50-130 psi.

| Aggregate Composition | |
| --- | --- |
| Component | Wt % |
| $SiO_2$ | 63 |
| $Al_2O_3$ | 15 |
| FeO | 9 |
| CaO | 5 |
| $Na_2O$ | 3 |
| $TiO_2$ | 2 |
| MgO | 1.5 |
| $K_2O$ | 1.4 |

| Aggregate Grade | |
| --- | --- |
| Sieve Size | % Passing |
| 2" | 100 |
| 1½" | 100 |
| ¾" | 84 |
| ½" | 31 |
| #10 | 17 |
| #40 | 13 |
| #200 | 8.8 |

| Quicklime Grade | |
| --- | --- |
| Sieve Size | % Passing |
| #4 | 100 |
| #100 | 62 |

TABLE 1

| Ex. No. | Density (lb/ft³) | % Moisture Content | Qu* (psi) |
| --- | --- | --- | --- |
| 1 | 110 | 17 | 161 |
| 2 | 114 | 15 | 321 |
| 3 | 118 | 16 | 283 |
| 4 | 112 | 17 | 222 |

*Qu = unconfined compressive strength

EXAMPLES 5-8

Aggregate having substantially the same composition as that of Examples 1-4 and the grade noted below was mixed in the same manner as in Examples 1-4 with 2 wt % quicklime of the same grade as Examples 1-4 and compacted and tested in the same manner as in Examples 1-4, with the results reported in Table 2. Average unconfined compressive strength was 450 psi, again substantially exceeding the AASHTO minimums.

| Aggregate Grade | |
| --- | --- |
| Sieve Size | % Passing |
| 2" | 100 |

-continued

| Aggregate Grade | |
|---|---|
| Sieve Size | % Passing |
| 1½" | 100 |
| ¾" | 87 |
| ¼" | 47 |
| #10 | 27 |
| #40 | 19 |
| #200 | 13 |

TABLE 2

| Ex. No. | Density (lb/ft$^3$) | % Moisture Content | Qu (psi) |
|---|---|---|---|
| 5 | 108 | 16 | 435 |
| 6 | 105 | 16 | 480 |
| 7 | 106 | 16 | 486 |
| 8 | 105 | 16 | 397 |

COMPARATIVE EXAMPLES 9-12

Four additional samples of the same aggregate used in Examples 5-8 were mixed with 1 wt % quicklime, and compacted and tested in the same manner as in Examples 1-4, with the results reported in Table 3. Average unconfined compressive strength was 125 psi.

TABLE 3

| Ex. No. | Density (lb/ft$^3$) | % Moisture Content | Qu (psi) |
|---|---|---|---|
| 9 | 106 | 18 | 143 |
| 10 | 106 | 18 | 98 |
| 11 | 107 | 18 | 141 |
| 12 | 107 | 18 | 119 |

EXAMPLES 13-14

Full scale field test determination was made of the average in situ resilient modulus of lime-treated aggregate of substantially the same composition as that of Examples 1-4 with the exception that the +¾" fraction was left intact, the composition being placed as a pavement base course. Measurement was by a falling weight deflectometer in accordance with the procedure of ASTM D4694 at two separate locations designated as A and B. Location B was measured both in an uncompacted area and in an area that had been compacted by about 4 months' worth of daily heavy truck traffic and which had been exposed to over 5 inches of rainfall, and showed a very dramatic increase in strength as a result of the compaction. The subgrade in Location A was compacted to 98% of standard Proctor as determined by AASHTO test T99. The results are shown in Table 4, and demonstrate that resilient modulus values for the compacted lime-treated aggregate substantially exceed the typical values of 20,000-25,000 psi for conventional untreated base and subbase aggregate.

TABLE 4

| Ex. No./ Location | Avg. Modulus (psi) | Layer Thickness (inches) |
|---|---|---|
| 13/A | 30,630 | 37-39 |
| 14/B | 16,880* | 6 |
|  | 60,870** | 6 |

*uncompacted
**compacted

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A base and subbase paving composition consisting essentially of 1.5 to 2 wt % quicklime mixed with an aggregate comprising the approximate weight percentages of the following components:

| Component | Wt % |
|---|---|
| $SiO_2$ | 60-65 |
| $Al_2O_3$ | 10-20 |
| FeO | 5-15 |
| CaO | 3-7 |
| $Na_2O$ | 1-5. |

2. The composition of claim 1 wherein said aggregate is of the following gradation, as determined by ASTM testing procedures C117 and C136:

| Sieve Size | % Passing |
|---|---|
| 2" | 100 |
| 1½" | 95-100 |
| 1" | 60-98 |
| ¾" | 52-92 |
| ¼" | 40-80 |
| #4 | 12-52 |
| #40 | 8-30 |
| #200 | 5-20 |

3. The composition of claim 1 wherein said quicklime has a potency rating of at least 113% calcium hydroxide content as determined by AASHTO testing procedure T219.

4. The composition of claim 1 wherein said quicklime is of the following gradation, as determined by AASHTO testing procedure T27:

| Sieve Size | % Passing |
|---|---|
| #4 | 100 |
| #100 | 40-80 |

* * * * *